Mar. 5, 1929.  H. LUBÉ  1,703,891
PROJECTING MACHINE
Filed Jan. 17, 1925  7 Sheets-Sheet 1

INVENTOR
Henry Lubé.
BY
Townsend + Decker
ATTORNEYS

Mar. 5, 1929.  H. LUBÉ  1,703,891
PROJECTING MACHINE
Filed Jan. 17, 1925   7 Sheets-Sheet 2

INVENTOR
*Henry Lubé.*
BY
*Townsend + Decker*
ATTORNEYS

Patented Mar. 5, 1929.

1,703,891

UNITED STATES PATENT OFFICE.

HENRY LUBÉ, OF COLLEGE POINT, NEW YORK.

PROJECTING MACHINE.

Application filed January 17, 1925. Serial No. 2,991.

My invention relates to a moving picture machine and especially to the projector thereof which is adapted preferably to be used in conjunction with an endless film on which the pictures to be shown are photographed or printed. Although it is not to be so limited in its application the invention is particularly adapted for use as an advertising device as its operation is a continuous one.

The object of my invention is to provide a machine of the character referred to which is inexpensive to manufacture, durable in construction, compact and easily transported.

Another object of my invention is to provide a machine with novel means for rotating an endless spiral film in a direction to present a succession of pictures before a lens.

A further object of the invention is to provide mechanism for automatically reversing the direction of movement of the film, and which shall preferably be actuated by the film itself.

Another object is to provide automatic means for energizing or de-energizing illuminating means such as a lamp when the film changes its direction of movement.

Other objects and advantages will be obvious from the following specification in which a practical embodiment of the invention is described.

In the accompanying drawings forming a part of this specification similar reference characters indicate corresponding parts throughout the several views.

Referring to the drawings, I have provided a box 15 having a cover 16 which is hinged thereto at 17, which cover is provided with an opening 18 therein. A handle 19 is also fastened to the device to provide carrying means therefor. Said box 15 contains a moving picture projecting mechanism to be described hereafter which is actuated by a motor (not shown) which is concealed within a casing 21 in the lower part of the box and which has its shaft 22 journalled in a partition 23 in said box to form two compartments 24 and 25.

Mounted in the upper portion of the compartment 24 and preferably secured to the partition 23 is a base plate 26 provided with side brackets 27 and 28 fastened thereto in any desired manner and also a front wall or plate 29 having a plurality of openings 30 therein equally spaced apart.

A casing 31 is provided which is hinged as at 32 to the base plate 26 and which is adapted to protect and hide certain mechanism and to act as a support for a film to be presently described. When said housing is in closed position it may be held down by any suitable spring clip 33 secured, if so desired, to the bracket 27.

34 indicates a gate provided with openings 35 and 36 adjacent either side thereof, said gate being hinged as at 37 to the bracket 27 so that it may be swung outwardly on its hinge. To retain the gate in closed position I have provided a thumb screw 38 carried by the bracket 28 which engages within the slot of a slotted arm 39 which is secured to the end of the gate. A thin metal plate 40 is also mounted or fastened to the upper side of the gate and carries a spring metal plate 41 to the inner side of which is secured a strip of felt 42 adapted to bear against a film containing the pictures to be projected.

An electric lamp 43 is mounted on the base plate 26 and is secured in a conventional socket 44 directly behind a lens housing 45 which carries a plurality of lenses 46. The light from lamp 43 thus passes through the lenses 46 through suitable openings in the front wall or plate 29 and the gate 34 and through a secondary lens 47 which is adjustably mounted in a bracket 48 fastened to the gate 34.

Figure 9:
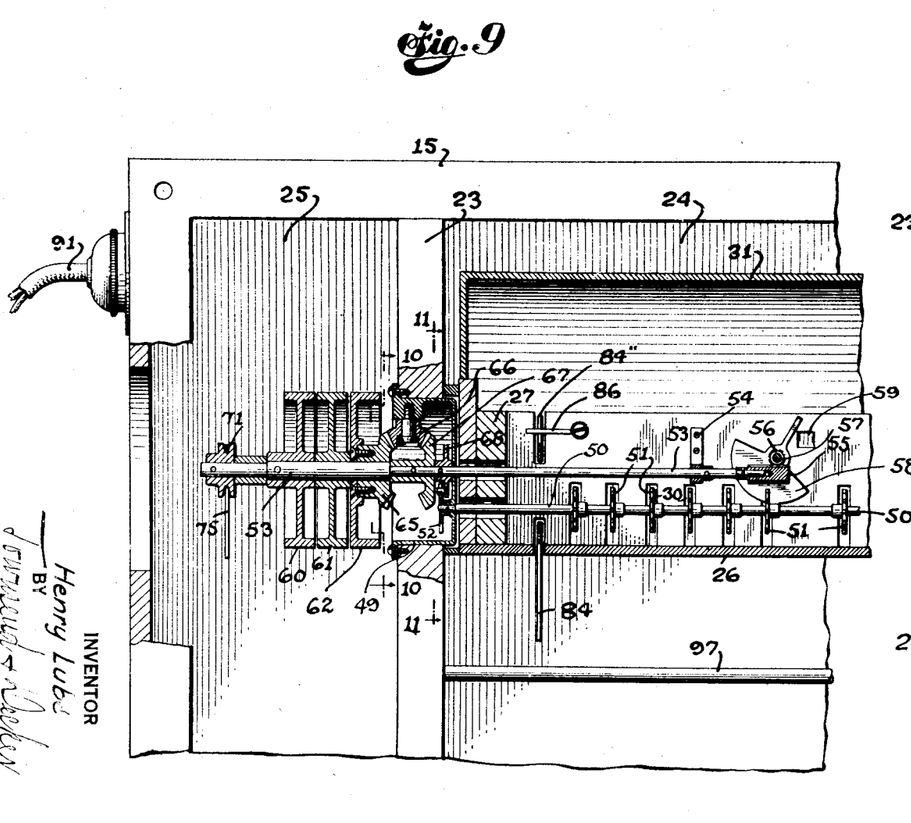
Fig. 9 is a horizontal section on the line 9—9 of Fig. 3.
Figure 10:
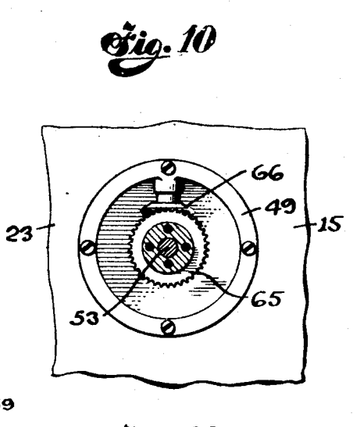
Fig. 10 is a vertical section on the line 10—10 of Fig. 9.
Figure 11:
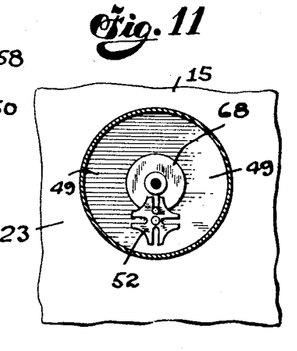
Fig. 11 is a vertical section on the line 11—11 of Fig. 9.

The partition 23 is provided with an opening extending therethrough within which a housing 49 is secured by suitable screws as shown. A sprocket shaft is indicated at 50 and has mounted thereon a plurality of sprockets 51 extending slightly through the openings 30 in the front wall or plate 29. Said sprocket shaft is journalled in bearings in the brackets 27 and 28 and one end thereof extends within the housing 49 as illustrated in Fig. 9. This end of the shaft carries a Maltese-cross wheel 52.

53 indicates the main drive shaft which is supported in a suitable bearing in the bracket 27 as well as in a bearing 54 secured to the front wall 29. One end of said shaft carries a gear 55 meshing with a pinion 56 carried by a shaft 57 which is mounted on the wall 29. A conventional form of shutter 58 is also mounted on the shaft 57 and is adapted to intermittently close an aperture 59 in the front wall 29 when the shaft 53 is rotated for purposes well known and old in the art and therefore requiring no detailed explanation. The shaft 53 extends through the housing 49 and into the compartment 25.

The shaft 53 carries pulleys 60, 61 and 62, the pulley 60 being fixed on said shaft while the pulleys 61 and 62 are loose thereon. The pulley 61 acts as an idler whereby an endless belt 63 which passes over a pulley 64 carried by the motor shaft 22 may be shifted from pulleys 62 and 60 or vice versa for a purpose to be presently described. The pulley 62 has secured thereto a gear 65 meshing with a pinion 66 rotatably mounted on the upper wall of the housing 49. Said pinion 66 meshes with a gear 67 which is fast on the shaft 53. Said shaft also carries a pin wheel 68 secured thereon which engages the Maltese-cross wheel 52 whereby when the shaft 53 is rotated an intermittent rotatable movement will be given the sprocket shaft 30 by means of the well known Geneva movement.

69 indicates the arm of a bracket 70 which is secured to the partition 23. The end of the main driving shaft 53 is supported in a suitable bearing in said arm. A pulley 71 is also secured on the end of said shaft 53. 72 indicates a shaft which is journalled in the partition 23 and in a bracket 73 fastened to and extending downwardly from the side bracket 28. Said shaft 72 is also supported by the arm 69 and carries loosely on the end thereof a pulley 74. An endless belt 75 passes over said pulley 74 and the pulley 71. The end of the shaft 72 has an arm 76 fastened thereto and a spring 77 is provided which has one end fastened to said arm and the other end fastened to a pin carried by the pulley 74. The pulley 74 is also provided with two laterally projecting pins 78 and 79 adapted to engage the fixed arm 69 of the bracket 70 to limit the movement of rotation of said pulley on shaft 72. Said shaft has also secured thereto a belt-shifter 80 provided with the usual cam-slot therein receiving the belt 63. As shown particularly in Figs. 4, 12 and 13 the shaft 72 is also provided with a pair of pawls 81 and 82 adapted to rotate therewith and which extend therefrom at approximately an angle of 90° with respect to each other.

83 and 84 indicate triggers pivoted on the walls of suitable slots in the front wall or plate 29 and provided with lower hooks 83' and 84' respectively adapted to be engaged by the pawls 81 and 82. Said triggers are also provided with heads 83'' and 84'' adapted to extend through slots in said front wall 29 so that their position may be seen through the openings 36 and 35 in the gate 34. Springs 85 and 86 are also provided and are fastened to any other convenient place on the device. The springs, by their action, tend to rock said triggers on their pivots in a direction whereby their heads will be projected forwardly.

The shaft 72 also carries a circuit-breaker 85' so positioned thereon as to engage and raise a button 86' upwardly when the head 83'' of the trigger 83 is retracted inwardly. Said button 86' is slidably mounted in a suitable opening in the base plate 26 and carries a spring contact 87 fastened to an insulating block 88, said contact being turned up at right angles as shown at 89. When said button is pressed upwardly the upper portion of said contact will become disengaged from a terminal 90 to open an electrical circuit to said light and de-energize the lamp 43.

Figure 3:
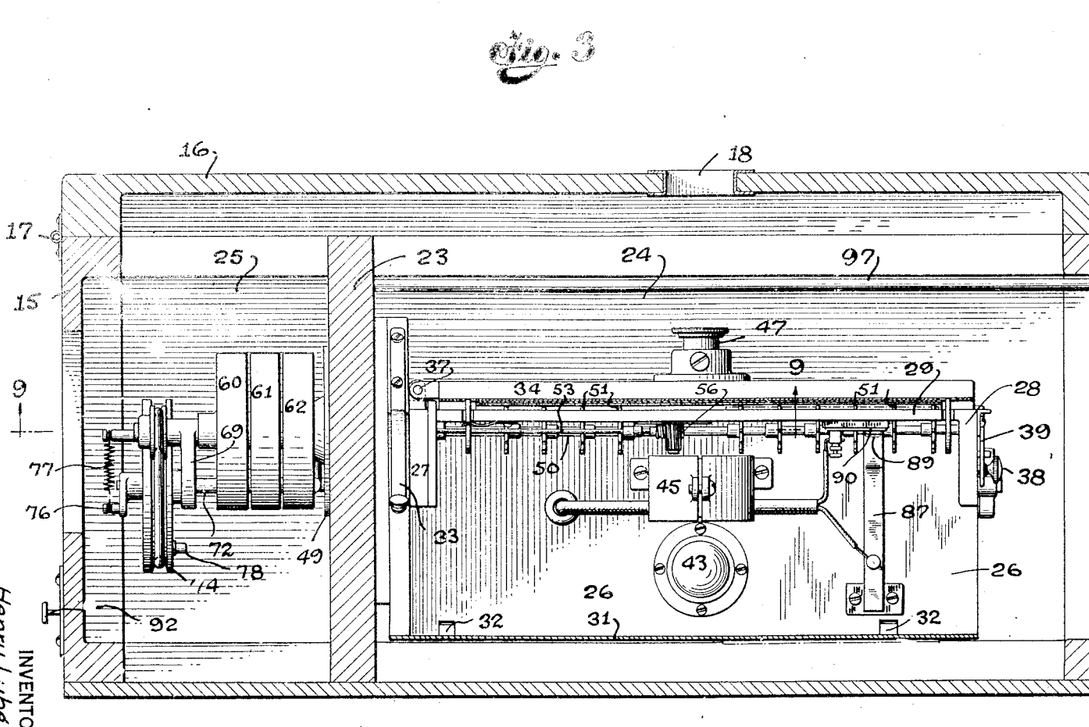
Fig. 3 is a plan view (partly in section) with the top removed.

91 indicates a wire adapted to be connected with a source of current supply to operate the motor in the casing 21 and to energize the lamp 43. The electrical connections in the box to the motor and lamp are omitted for the sake of clearness as they form no part of my invention but they are controlled by the switch buttons 92 and 93 which when actuated open or close the circuits both for the motor and lamp. Some of the wires leading to the lamp are shown in Fig. 3, however, it being understood that the connections in the system are such that the lamp may be energized or de-energized automatically while the motor is still running.

For the specific projecting apparatus described I prefer to employ an endless film 94 on which the pictures 95 are photographed or printed in a spiral running lengthwise of the film, such film being of the configuration and form as is described in my co-pending application filed November 10, 1921, Serial No. 514,174. The film is provided with a spiral row of perforations 96 the turns of which are parallel to the turns of the spiral described by the succession of pictures 95. These perforations afford driving perforations adapted to receive the teeth or arms of the drive sprockets 51 whereby when the film is in proper position and the sprocket shaft 50 is rotated, the film will be moved or traversed longitudinally of said shaft and will simultaneously take a spiral movement owing to the spiral disposition of said perforations.

The film 94 is mounted in position for projecting the pictures thereon by running it over the casing 31 at the righthand side thereof and intermediate said casing and the felt 42 of the spring metal plate 41, which holds the film firmly in position. The teeth of the sprockets 51 at said righthand side are then brought through the proper perforations 96 in the film at the starting point thereof. A rod 97 which is slidable in the partition 23 may also be provided around which the film also extends although this is not necessary to properly practice the invention.

After the film has been mounted in the proper position at its starting point the gate 34 is closed and the switch buttons 92 and 93 are pulled out to energize the lamp and start the motor. The belt 63 is then running over pulley 62 which is loosely mounted on the driving shaft 53 as previously explained, but which is coupled up therewith by the gears and pinion connections hereinbefore described. As the belt 63 passes over the pulley on the motor shaft, when the motor is started the pulley 62 rotates thereby causing rotation of the pulley 71 which rotates the pulley 74 in the same direction until the pin 79 engages the arm 69 of the bracket 70 against the tension of the spring 77, the belt 75 thereafter merely sliding over the pulley 74. The head 84″ of the trigger 84 is projected forwardly, as previously described, and the lower hooked end 84′ of said trigger engages with the pawl 82 on the shaft 72. The film is then caused to traverse to the left, as indicated by the arrow at the bottom of the film in Fig. 2, and is also caused to rotate around the casing spirally in the direction indicated by the arrow on said film. The movement of said film, moreover, is an intermittent one, as the sprocket shaft 50 rotates intermittently for the reason and because of the Geneva movement 52, 68, as heretofore explained. As the film passes in front of the openings in the lenses the light from the lamp projects the pictures of the film on any suitable screen which may be provided, the shutter 58 working in synchronism with the movement of the film in a manner well known in the art.

Figure 1:
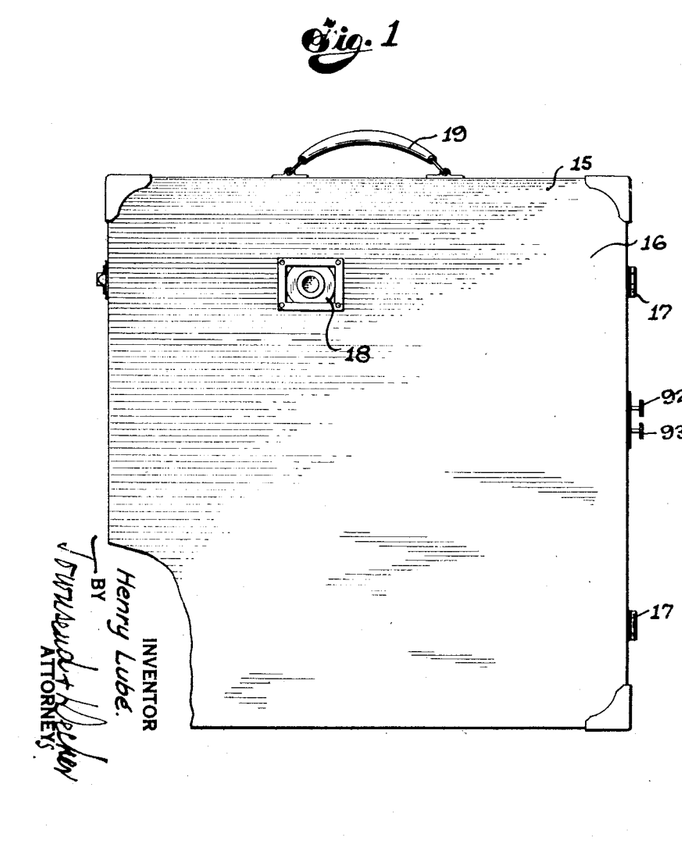
Fig. 1 is a side elevation of the machine of my invention.
Figure 2:
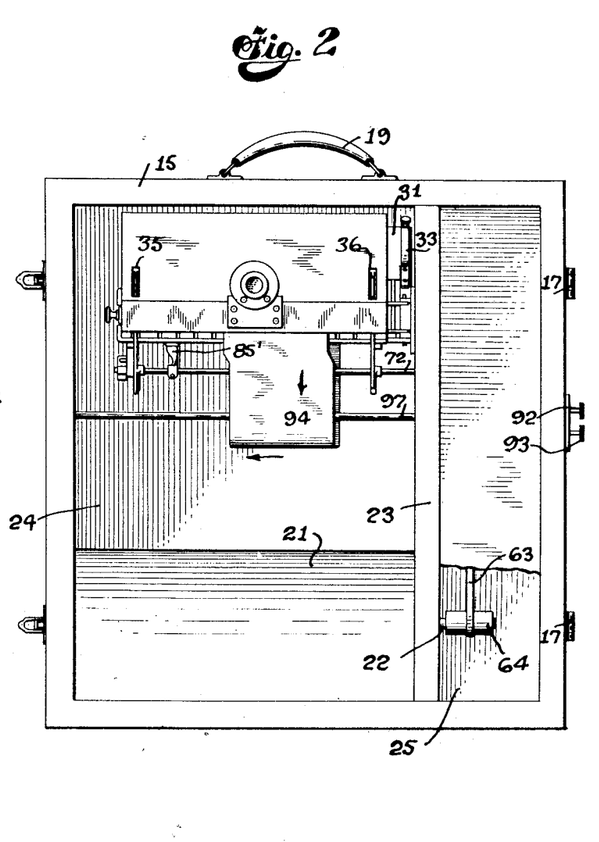
Fig. 2 is a similar view with the cover removed.
Figure 4:
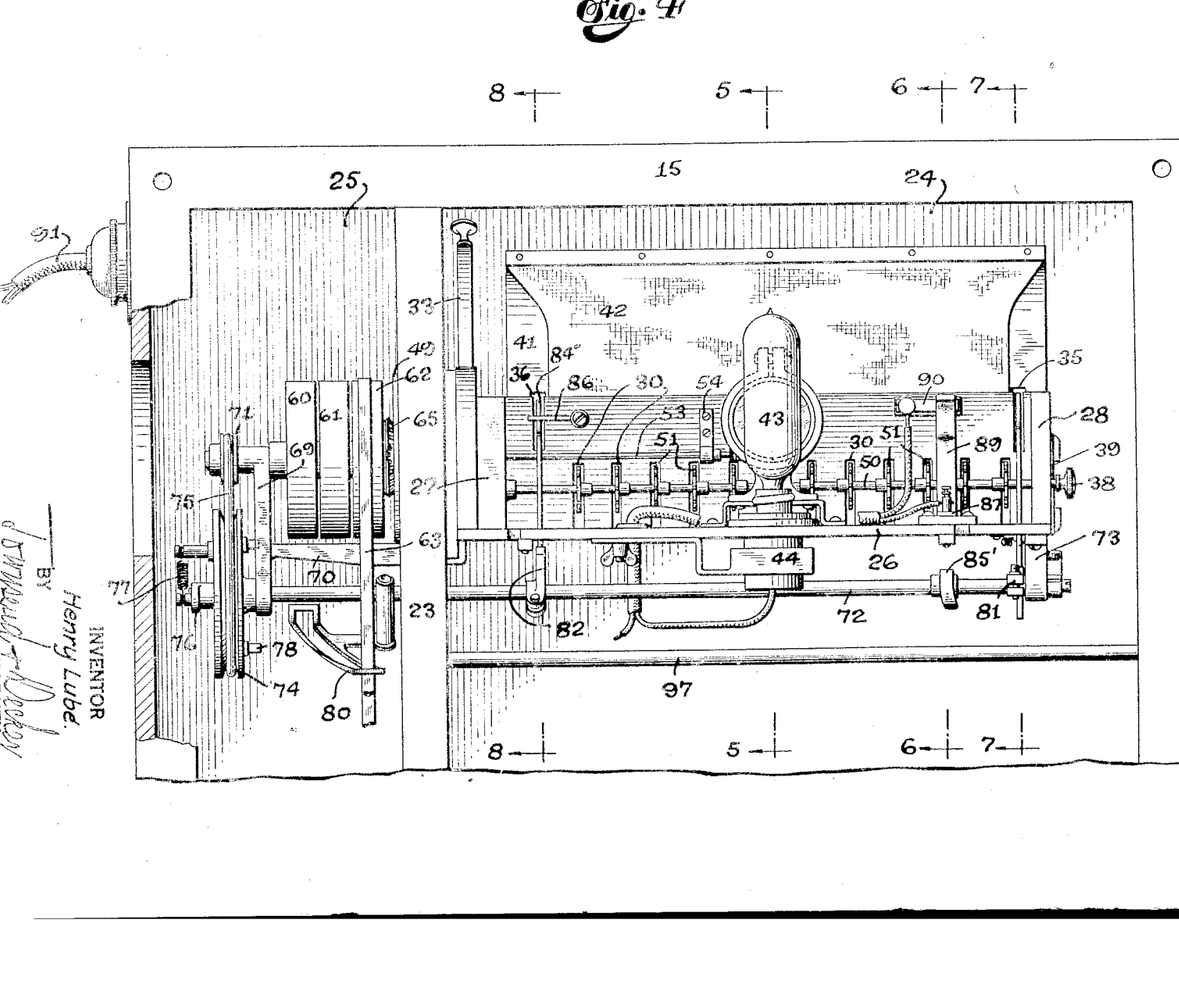
Fig. 4 is a rear elevation (partly in section) with the rear wall removed.
Figure 5:
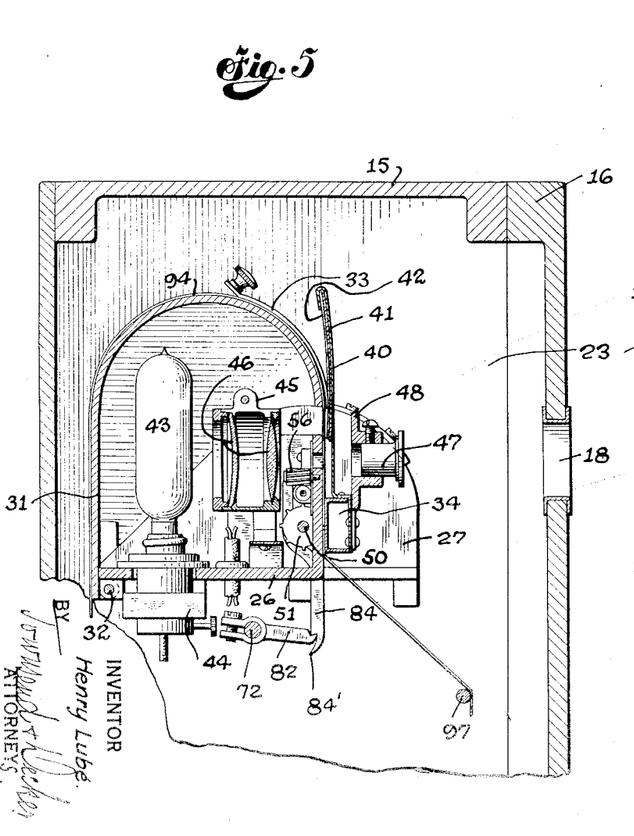
Fig. 5 is a section on the line 5—5 of Fig. 4.
Figure 6:
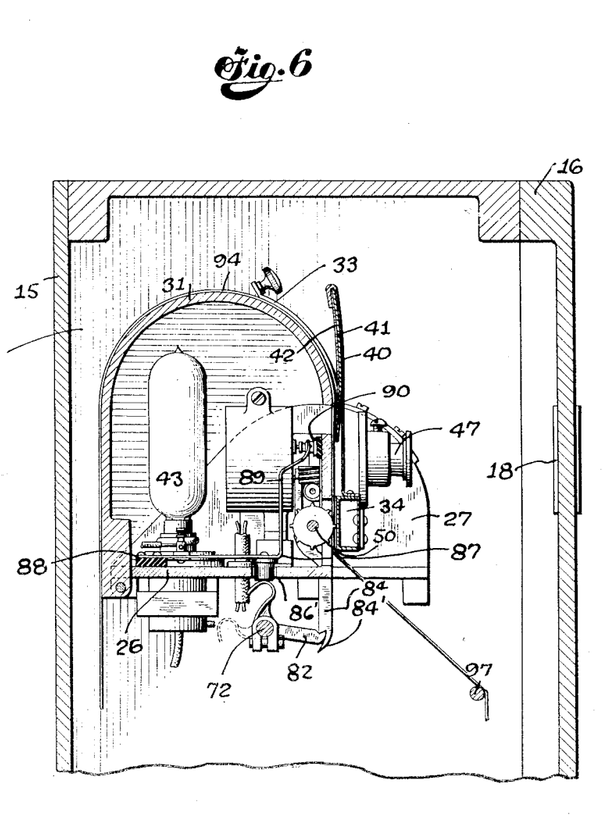
Fig. 6 is a section on the line 6—6 of Fig. 4.
Figure 7:
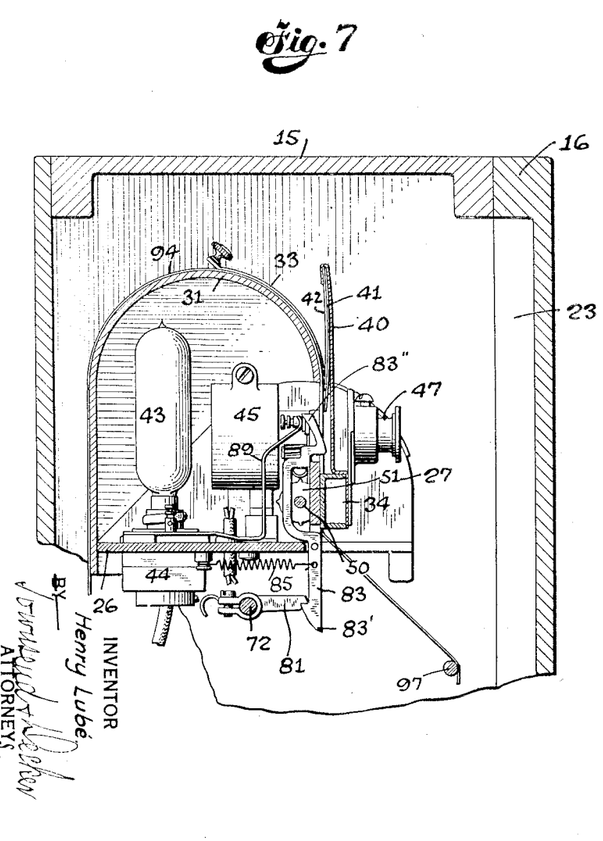
Fig. 7 is a section on the line 7—7 of Fig. 4.
Figure 8:
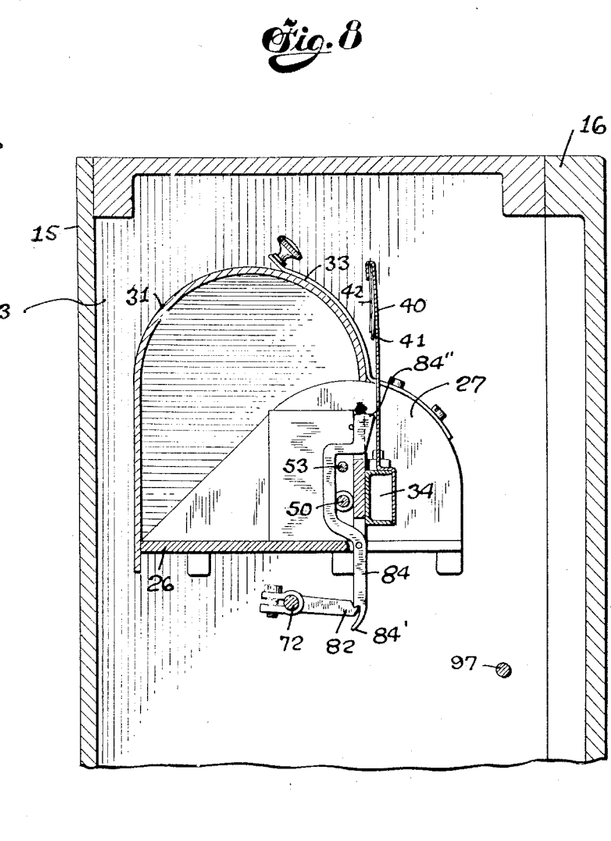
Fig. 8 is a section on the line 8—8 of Fig. 4.
Figures 12, 13:
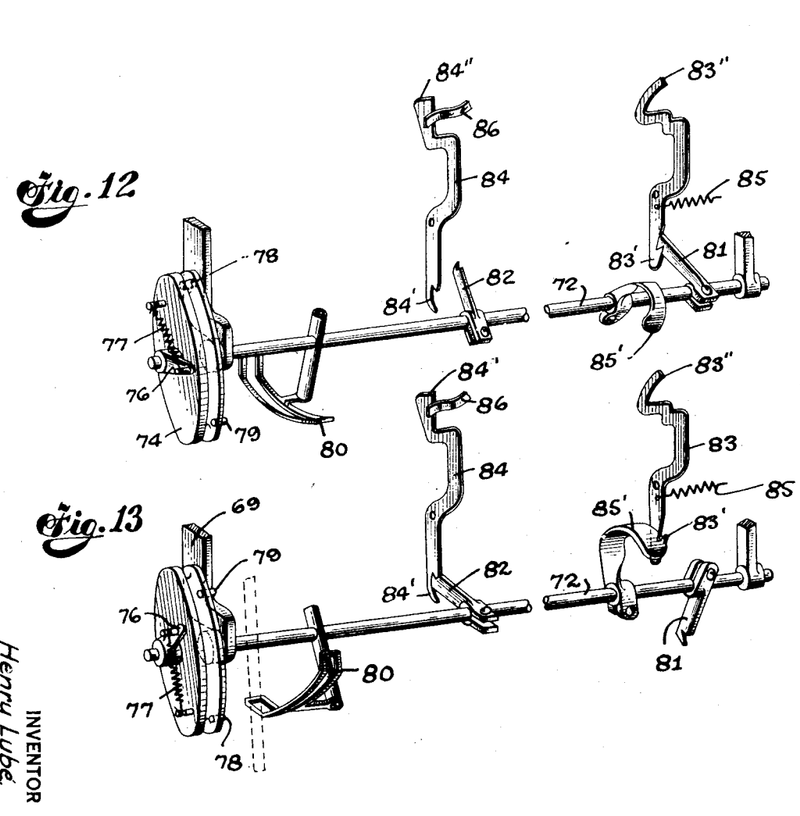
Figs. 12 and 13 are perspective views of the reversing mechanism.
Figure 14:
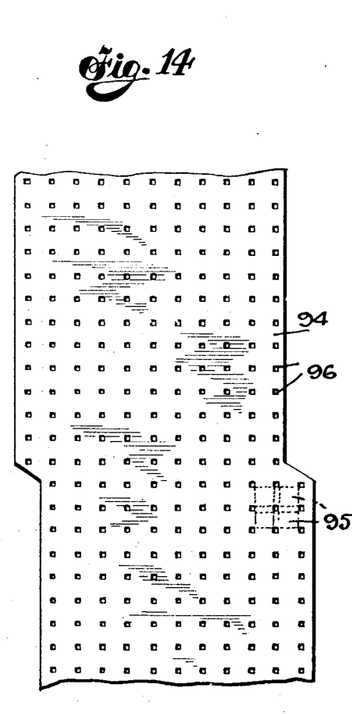
Fig. 14 is a fragmentary elevation of the film.

After the film has completed its movement to the left, as viewed in Figs. 2 and 4 it engages the head 84″ of the trigger 84 to release the hooked end 84′ from engagement with the pawl 82 whereupon the action of the spring 77, which is then under tension, rotates the shaft 72, the belt-shifter 80 also then acting to shift the belt 63 from the pulley 62, over the idler 61, and onto the pulley 60. This partial rotation of the shaft 72 rocks the trigger 83 on its pivot in a forward direction whereby its head 83″ will be projected forwardly and its hooked end 83′ will engage the pawl 81 on the shaft 72, as indicated in Fig. 12. The circuit-breaker 85′ also simultaneously functions in the manner previously described to break the electrical circuit for the lamp and thereby de-energize the lamp.

As the shaft 72 is partially rotated in the direction described, the pin 78 is brought into engagement with the arm 69 of the bracket 70 against the tension of the spring 77. As the belt meanwhile has been shifted over onto the pulley 60, the driving shaft as well as the sprocket shaft rotate in a direction opposite to that in which they first rotated so that the film will be traversed or moved to the right, whereby what might be termed a "re-winding" operation is automatically effected.

When the film has again been returned to its initial or starting position the trigger 83 is tripped to release its lower hooked end 83′ from the pawl 81 and the hooked end 84′ of the trigger 84 is brought into engagement with the pawl 82, the belt meanwhile being shifted from the pulley 60 across the idler 61, to the pulley 62, the opposite movements previously described now taking place. The light again then becomes energized because the circuit-breaker 85′ is released from the button 86′ and the film is again spirally traversed to the left.

The purpose of the automatic deenergizing of the lamp upon the return movement of the film is not only for the purpose of saving current but is to permit the film and other parts to cool so as to prevent any possibility of fire thereto or to the machine.

This is an important feature of the invention and as the machine is especially adapted for advertising purposes and the operation thereof is a continuous one as long as the current is "on".

What I claim as my invention is:—

1. In a motion picture apparatus, the combination with a spiral endless film, projecting means, illuminating means, means for traversing said film intermediate said projecting means and illuminating means, means for returning the film to its initial position, said last mentioned means being operated by engagement of said film therewith upon said film reaching a predetermined position and automatic means for de-energizing said illuminating means upon return movement of said film.

2. In a motion picture apparatus, the combination with an endless film provided with a series of spirally arranged openings therein, a plurality of film advancing elements adapted to engage within said openings, means for operating said elements for causing said film to be traversed laterally, and automatic means for reversing the direction of operation of said elements upon said film reaching a predetermined lateral position whereby the direction of traversal of said film may be reversed.

3. In a motion picture apparatus, the combination with a support, a film, means for traversing said film from one side of said support to the other side and means actuated by said film for reversing the direction of traverse of said film.

4. In a motion picture apparatus, the combination with a support, an endless film adapted to engage said support, means for moving said film longitudinally of said support and therearound and means adapted to be actuated by said film for reversing both directions of movement of said film.

5. In a motion picture apparatus, the combination with an endless film provided with a spiral series of openings therein, a plurality of rotatable sprockets adapted to engage within said openings, means for rotating said sprockets to move said film laterally in one direction and means actuated by said film to reverse the direction of rotation of said sprockets to move said film laterally in the opposite direction.

6. In a motion picture apparatus, the combination with a film, illuminating means, means for intermittently moving said film forwardly and laterally and means actuated by said film for de-energizing said illuminating means when said film has been moved to a predetermined position.

7. In a motion picture apparatus, the combination with an endless film, illuminating means, means for moving said film forwardly and for moving the same laterally in either direction and means actuated by said film for de-energizing said illuminating means when said film is moved laterally in one direction.

8. In a motion picture apparatus, the combination with an endless film, illuminating means, means for moving said film laterally in either direction and for rotating said film for advancing sections of the film successively in the path of said illuminating means, means actuated by said film for de-energizing said illuminating means when said film has moved laterally in one direction to a predetermined position.

9. In a motion picture apparatus, the combination with a support, an endless film extending around and engaging said support, means for automatically rotating said film around said support and for simultaneously moving said film laterally with respect thereto and means for reversing both directions of movement of said film to effect a "re-winding" thereof.

10. In a motion picture apparatus, the combination with an endless film provided with a series of spirally arranged openings therein, a support engaged by said film, a sprocket shaft provided with a plurality of sprockets thereon adapted to engage the openings in the film, means for rotating said sprocket shaft whereby said film will be rotated around said support and will be traversed laterally thereof and means adapted to be actuated by said film for reversing the direction of rotation of said sprocket shaft whereby said film will be moving laterally and rotating in an opposite direction.

11. In a motion picture apparatus, the combination with a support provided with a plurality of slots therein, a sprocket shaft having a plurality of sprockets mounted thereon and extending through said slots, an endless film provided with a series of openings therein encircling said film a plurality of times in offset relation and adapted to be engaged by several of the sprockets on said sprocket shaft whereby said film will be moved forwardly and also laterally in one direction and means for automatically reversing the rotation of said sprocket shaft for moving said film in the opposite direction.

12. In a motion picture apparatus, the combination with a support provided with a plurality of slots therein, a sprocket shaft having a plurality of sprockets mounted thereon and extending through said slots, a relatively broad film band adapted to be supported by and to be moved relatively to said support, said film having a spiral series of openings encircling said band and adapted to be engaged by a plurality of said sprockets for advancing said film and moving the same laterally across said support, means for rotating said sprockets and controlled by the switch buttons 92 and 93 which when actuated open or close the circuits both for the motor and lamp. Some of the wires leading to the lamp are shown in Fig. 3, however, it being understood that the connections in the system are such that the lamp may be energized or de-energized automatically while the motor is still running.

For the specific projecting apparatus described I prefer to employ an endless film 94 on which the pictures 95 are photographed or printed in a spiral running lengthwise of the film, such film being of the configuration and form as is described in my co-pending application filed November 10, 1921, Serial No. 514,174. The film is provided with a spiral row of perforations 96 the turns of which are parallel to the turns of the spiral described by the succession of pictures 95. These perforations afford driving perforations adapted to receive the teeth or arms of the drive sprockets 51 whereby when the film is in proper position and the sprocket shaft 50 is rotated, the film will be moved or traversed longitudinally of said shaft and will simultaneously take a spiral movement owing to the spiral disposition of said perforations.

The film 94 is mounted in position for projecting the pictures thereon by running it over the casing 31 at the righthand side thereof and intermediate said casing and the felt 42 of the spring metal plate 41, which holds the film firmly in position. The teeth of the sprockets 51 at said righthand side are then brought through the proper perforations 96 in the film at the starting point thereof. A rod 97 which is slidable in the partition 23 may also be provided around which the film also extends although this is not necessary to properly practice the invention.

After the film has been mounted in the proper position at its starting point the gate 34 is closed and the switch buttons 92 and 93 are pulled out to energize the lamp and start the motor. The belt 63 is then running over pulley 62 which is loosely mounted on the driving shaft 53 as previously explained, but which is coupled up therewith by the gears and pinion connections hereinbefore described. As the belt 63 passes over the pulley on the motor shaft, when the motor is started the pulley 62 rotates thereby causing rotation of the pulley 71 which rotates the pulley 74 in the same direction until the pin 79 engages the arm 69 of the bracket 70 against the tension of the spring 77, the belt 75 thereafter merely sliding over the pulley 74. The head 84″ of the trigger 84 is projected forwardly, as previously described, and the lower hooked end 84′ of said trigger engages with the pawl 82 on the shaft 72. The film is then caused to traverse to the left, as indicated by the arrow at the bottom of the film in Fig. 2, and is also caused to rotate around the casing spirally in the direction indicated by the arrow on said film. The movement of said film, moreover, is an intermittent one, as the sprocket shaft 50 rotates intermittently for the reason and because of the Geneva movement 52, 68, as heretofore explained. As the film passes in front of the openings in the lenses the light from the lamp projects the pictures of the film on any suitable screen which may be provided, the shutter 58 working in synchronism with the movement of the film in a manner well known in the art.

After the film has completed its movement to the left, as viewed in Figs. 2 and 4 it engages the head 84″ of the trigger 84 to release the hooked end 84′ from engagement with the pawl 82 whereupon the action of the spring 77, which is then under tension, rotates the shaft 72, the belt-shifter 80 also then acting to shift the belt 63 from the pulley 62, over the idler 61, and onto the pulley 60. This partial rotation of the shaft 72 rocks the trigger 83 on its pivot in a forward direction whereby its head 83″ will be projected forwardly and its hooked end 83′ will engage the pawl 81 on the shaft 72, as indicated in Fig. 12. The circuit-breaker 85′ also simultaneously functions in the manner previously described to break the electrical circuit for the lamp and thereby de-energize the lamp.

As the shaft 72 is partially rotated in the direction described, the pin 78 is brought into engagement with the arm 69 of the bracket 70 against the tension of the spring 77. As the belt meanwhile has been shifted over onto the pulley 60, the driving shaft as well as the sprocket shaft rotate in a direction opposite to that in which they first rotated so that the film will be traversed or moved to the right, whereby what might be termed a "re-winding" operation is automatically effected.

When the film has again been returned to its initial or starting position the trigger 83 is tripped to release its lower hooked end 83′ from the pawl 81 and the hooked end 84′ of the trigger 84 is brought into engagement with the pawl 82, the belt meanwhile being shifted from the pulley 60 across the idler 61, to the pulley 62, the opposite movements previously described now taking place. The light again then becomes energized because the circuit-breaker 85′ is released from the button 86′ and the film is again spirally traversed to the left.

The purpose of the automatic deenergizing of the lamp upon the return movement of the film is not only for the purpose of saving current but is to permit the film and other parts to cool so as to prevent any possibility of fire thereto or to the machine.

This is an important feature of the invention and as the machine is especially adapted for advertising purposes and the operation thereof is a continuous one as long as the current is "on".

What I claim as my invention is:—

1. In a motion picture apparatus, the combination with a spiral endless film, projecting means, illuminating means, means for traversing said film intermediate said projecting means and illuminating means, means for returning the film to its initial position, said last mentioned means being operated by engagement of said film therewith upon said film reaching a predetermined position and automatic means for de-energizing said illuminating means upon return movement of said film.

2. In a motion picture apparatus, the combination with an endless film provided with a series of spirally arranged openings therein, a plurality of film advancing elements adapted to engage within said openings, means for operating said elements for causing said film to be traversed laterally, and automatic means for reversing the direction of operation of said elements upon said film reaching a predetermined lateral position whereby the direction of traversal of said film may be reversed.

3. In a motion picture apparatus, the combination with a support, a film, means for traversing said film from one side of said support to the other side and means actuated by said film for reversing the direction of traverse of said film.

4. In a motion picture apparatus, the combination with a support, an endless film adapted to engage said support, means for moving said film longitudinally of said support and therearound and means adapted to be actuated by said film for reversing both directions of movement of said film.

5. In a motion picture apparatus, the combination with an endless film provided with a spiral series of openings therein, a plurality of rotatable sprockets adapted to engage within said openings, means for rotating said sprockets to move said film laterally in one direction and means actuated by said film to reverse the direction of rotation of said sprockets to move said film laterally in the opposite direction.

6. In a motion picture apparatus, the combination with a film, illuminating means, means for intermittently moving said film forwardly and laterally and means actuated by said film for de-energizing said illuminating means when said film has been moved to a predetermined position.

7. In a motion picture apparatus, the combination with an endless film, illuminating means, means for moving said film forwardly and for moving the same laterally in either direction and means actuated by said film for de-energizing said illuminating means when said film is moved laterally in one direction.

8. In a motion picture apparatus, the combination with an endless film, illuminating means, means for moving said film laterally in either direction and for rotating said film for advancing sections of the film successively in the path of said illuminating means, means actuated by said film for de-energizing said illuminating means when said film has moved laterally in one direction to a predetermined position.

9. In a motion picture apparatus, the combination with a support, an endless film extending around and engaging said support, means for automatically rotating said film around said support and for simultaneously moving said film laterally with respect thereto and means for reversing both directions of movement of said film to effect a "re-winding" thereof.

10. In a motion picture apparatus, the combination with an endless film provided with a series of spirally arranged openings therein, a support engaged by said film, a sprocket shaft provided with a plurality of sprockets thereon adapted to engage the openings in the film, means for rotating said sprocket shaft whereby said film will be rotated around said support and will be traversed laterally thereof and means adapted to be actuated by said film for reversing the direction of rotation of said sprocket shaft whereby said film will be moving laterally and rotating in an opposite direction.

11. In a motion picture apparatus, the combination with a support provided with a plurality of slots therein, a sprocket shaft having a plurality of sprockets mounted thereon and extending through said slots, an endless film provided with a series of openings therein encircling said film a plurality of times in offset relation and adapted to be engaged by several of the sprockets on said sprocket shaft whereby said film will be moved forwardly and also laterally in one direction and means for automatically reversing the rotation of said sprocket shaft for moving said film in the opposite direction.

12. In a motion picture apparatus, the combination with a support provided with a plurality of slots therein, a sprocket shaft having a plurality of sprockets mounted thereon and extending through said slots, a relatively broad film band adapted to be supported by and to be moved relatively to said support, said film having a spiral series of openings encircling said band and adapted to be engaged by a plurality of said sprockets for advancing said film and moving the same laterally across said support, means for rotating said sprockets and means for reversing the direction of rotation thereof, said last mentioned means being responsive to the lateral position of said film.

13. In a motion picture apparatus, the combination with a rotatable sprocket shaft having a plurality of sprockets mounted thereon, an endless film provided with a spiral series of openings therein adapted to receive the teeth of said sprockets whereby said film may be moved longitudinally of said sprocket shaft as well as therearound, a main driving shaft, a shutter operable thereby, means connecting said driving shaft and said sprocket shaft to rotate said sprocket shaft intermittently, a supplemental shaft connected to said main driving shaft and pivoted reversing means actuated by said film for connecting said means to said supplemental shaft whereby the direction of movement of said film is automatically reversed.

14. In a motion picture apparatus, the combination with a main driving shaft, a sprocket shaft having a plurality of sprockets mounted thereon, means connecting said main driving shaft and said sprocket shaft, an endless film provided with openings therein adapted to be received by said sprockets, a lens, illuminating means for said lens, a supplemental shaft connected to said main driving shaft, a pivoted reversing device adapted to be engaged by said supplemental shaft and adapted to be actuated by said film to reverse the direction of rotation of said sprocket shaft whereby the direction of movement of said film is reversed and a circuit breaker carried by said supplemental shaft adapted to de-energize said illuminating means upon the reversal of rotation of said sprocket shaft.

15. In a motion picture apparatus, the combination with a base plate, a front wall provided with a plurality of openings therein, an endless film provided with a plurality of openings, a sprocket shaft having a plurality of sprockets mounted thereon and extending through the openings in said front wall and adapted to engage the openings in said film whereby said film may be moved longitudinally of said base plate and a pivoted trigger member projecting from said front wall and adapted to be tripped by said film whereby the direction of movement of said film may be reversed.

16. In a motion picture apparatus, the combination with a main driving shaft, film driving means connected thereto, a film adapted to be moved by said film driving means, means for rotating said main driving shaft, a plurality of pulleys mounted on said main driving shaft, a belt connected to said pulleys and said rotating means and means adapted to be engaged by said film for shifting said belt from one of said pulleys to another one whereby the direction of rotation of said main driving shaft and of said film driving means is reversed.

17. In a motion picture apparatus, the combination with a main driving shaft, a sprocket shaft, a plurality of sprockets mounted thereon, a film provided with a plurality of openings adapted to be engaged by said sprockets for driving said film, a supplemental shaft, means connecting said supplemental shaft and said main driving shaft and reversing means adapted to be engaged by said film for partially rotating said supplemental shaft to effect a reversal in the direction of rotation of said sprocket shaft and a reversal in the direction of movement of said film.

18. In a motion picture apparatus, the combination with a main driving shaft, a film driving shaft connected thereto, a film adapted to be engaged by said film driving shaft for moving the same, a supplemental shaft, a pulley mounted thereon, a spring connecting said pulley and said supplemental shaft, means connecting said pulley and said main driving shaft and means connecting said supplemental shaft and adapted to be engaged by said film whereby said supplemental shaft is partially rotated and the direction of rotation of said film driving shaft and the direction of movement of said film are reversed.

19. In a motion picture apparatus, the combination with a main driving shaft, a film driving shaft connected thereto, means for driving said main driving shaft, a pulley loosely mounted on said main driving shaft, a gear connected to said pulley, a second gear connected to said main driving shaft, a pinion meshing with said gears, a second pulley connected to said main driving shaft, a belt engaging one or the other of said pulleys and said driving means, a film adapted to be driven by said film driving shaft and means adapted to be engaged by said film whereby said belt may be shifted from one to the other of said pulleys to effect a reversal of rotation of said film driving shaft.

20. In a motion picture apparatus, the combination with a main driving shaft, film driving means connected therewith, a film adapted to engage and be moved by said film driving means, means for rotating said main driving shaft, a pulley fast on said main driving shaft, a second pulley loose thereon and connected thereto by a system of gearing, a supplemental shaft, a pulley loose thereon, means connecting said last-named pulley and said main driving shaft, spring means connecting said last-named pulley and said supplemental shaft, stop members on said last-named pulley for limiting the movement of rotation thereof, a belt-shifter carried by said supplemental shaft, a belt engaging one of said first-named pulleys and said means for rotating said main driving shaft and adapted to be shifted by said belt-shifter from one of said first-named pulleys to the other one, a pivoted trigger adapted to be actuated by said film and a pawl carried by said supplemental shaft and adapted to engage said trigger.

Signed at New York, in the county of New York and State of New York, this 16th day of January, A. D. 1925.

HENRY LUBÉ.